(12) United States Patent
Austin

(10) Patent No.: US 6,266,532 B1
(45) Date of Patent: Jul. 24, 2001

(54) METHOD AND APPARATUS FOR DETERMINING THE OPTIMAL NUMBER OF ANALOG AND DIGITAL RADIOS IN A DUAL-MODE WIRELESS NETWORK

(75) Inventor: Mark David Austin, Atlanta, GA (US)

(73) Assignee: Bellsouth Intellectual Property Management Corporation, Atlanta, GA (US)

( * ) Notice: Subject to any disclaimer, the term of this patent is extended or adjusted under 35 U.S.C. 154(b) by 0 days.

(21) Appl. No.: 09/474,975

(22) Filed: Dec. 29, 1999

(51) Int. Cl.[7] ............... H04Q 7/20; H04B 1/38; H04M 1/00
(52) U.S. Cl. ............ 455/453; 455/453; 455/451; 455/552; 455/553
(58) Field of Search ............... 455/62, 450–453, 455/552, 553

(56) References Cited

U.S. PATENT DOCUMENTS 5,960,339 * 9/1999 Benveniste .................. 455/406

OTHER PUBLICATIONS

Traffic Analysis of Partially Overlaid AMPS/IS–136 Systems; IEEE Conference 1998; R. Ramesh and Kumar Balachandran, Ericsson Inc.

* cited by examiner

Primary Examiner—Daniel Hunter
Assistant Examiner—Meless Zewdu
(74) Attorney, Agent, or Firm—Kilpatrick Stockton LLP

(57) ABSTRACT

A predicted offered digital load, a predicted offered analog load, and an analog blocking factor are received to support a determination of the optimal number of analog and digital radios in a dual-mode wireless network. The number of analog radio channels necessary to support the offered analog load at the analog blocking factor is computed. The excess capacity of the needed analog radio channels is determined and a digital blocking factor based upon the excess analog capacity is calculated. The digital blocking factor may then be compared to minimum and maximum overflow values to ensure that the digital blocking factor is neither too high nor too low. The number of needed digital radio channels necessary to support the predicted offered digital load at the digital blocking factor is then calculated. Based upon the needed number of analog and digital radio channels, the number of digital and analog radios necessary is then calculated.

17 Claims, 5 Drawing Sheets

ILLUSTRATIVE EMBODIMENT

GENERAL OPERATING ENVIRONMENT

GENERAL OPERATING ENVIRONMENT

ILLUSTRATIVE EMBODIMENT

METHOD AND APPARATUS FOR DETERMINING THE OPTIMAL NUMBER OF ANALOG AND DIGITAL RADIOS IN A DUAL-MODE WIRELESS NETWORK

FIELD OF THE INVENTION

This invention generally relates to the field of wireless telecommunication. This invention particularly relates to optimizing the number of analog and digital radios used in a dual-mode wireless telecommunication network.

BACKGROUND OF THE INVENTION

Dual-mode capable wireless telecommunications networks permit wireless telephone subscribers to access the wireless network using either analog or digital radio telephones. In order to permit wireless communication using both analog cellular telephones and digital cellular telephones, dual-mode networks must be equipped with both analog and digital radios at every receiving station. Typically, each cell, or sector, within a dual-mode wireless network is equipped with both analog and digital radios at each receiving station to handle both types of signals.

When a wireless subscriber accesses a dual-mode wireless network using an analog radio telephone, the call is completed through an analog radio located at the nearest receiving station if an analog radio channel is available. If no analog communication channels are available at the receiving station, the subscriber is "blocked" from completing a call, and a long busy signal is played to the subscriber indicating that no call-handling capacity is currently available. The subscriber is then forced to hang up and to retry the call until an analog channel becomes available at the receiving station to handle the communication. If subscribers are frequently blocked in this manner, subscribers may become dissatisfied with their wireless service provider. Therefore, wireless service providers seek to provide enough analog radios to supply a sufficient number of analog radio channels so that subscribers are not frequently blocked.

When a subscriber accesses a dual-mode wireless network using a digital radio telephone, the call is completed through a digital radio located at the receiving station if a digital radio channel is available. However, if a digital channel is not available at the receiving station, the subscriber using a digital radio telephone is not "blocked" like the subscriber using an analog radio telephone. Rather, the communication from the subscriber using the digital radio telephone will "overflow" onto an analog radio channel if one is available. This is possible because most digital cellular telephones are capable of operating in both digital and analog modes. Therefore, if a digital radio channel is unavailable to handle the call, the call overflows onto an available analog channel.

If no analog or digital channels are available, the subscriber using the digital radio telephone will be blocked from completing the call. As discussed above, frequent call blocking is undesirable because it may frustrate wireless subscribers. The number of analog and digital radios installed in each sector throughout a dual-mode wireless network must therefore be chosen in a manner so as to provide enough radio channels to minimize call blocking. The number of analog and digital radios must also be chosen to minimize the total number of radios so that equipment costs may be kept low.

The number of analog and digital radios installed in a sector of a dual-mode wireless network is, in general, determined based upon predicted offered analog and digital loads. Typically, an estimate is made of the amount of digital and analog communication traffic that will be received in a given cell, or sector. The number of analog and digital radios necessary for the cell may then be calculated with several factors influencing the calculation. First, as described above, the total number of analog and digital radios should be chosen so as to minimize blocking. Second, the number of digital radios should be maximized because wireless subscribers prefer digital sound and because digital is a more efficient communications medium than analog. Third, the total number of analog and digital radios should be minimized so as to keep costs low for the wireless service provider while ensuring that wireless service can be provided at a competitive price.

Accordingly, there is a need for determining the number of analog and digital radios in a dual-mode wireless network that provides sufficient call-handling capacity so that call blocking is minimized, while also minimizing the total number of cellular radios. There is also a need for determining the number of analog and digital cellular radios in a dual-mode wireless network that maximizes the number of digital cellular radios and minimizes the number of analog cellular radios.

SUMMARY OF THE INVENTION

The present invention meets the needs described above by providing a method and apparatus for optimizing the number of analog and digital radios in a dual-mode wireless telecommunication system. The method and apparatus of the present invention calculates the number of analog and digital radios for each sector of a dual-mode wireless telecommunication network so that the total number of radios is minimized and so that the number of digital radios is maximized. This advantageously ensures that the amount of digital bandwidth will be maximized while also keeping costs low. The method and apparatus of the present invention also advantageously calculates the number of analog and digital radios so that call blocking is reduced, thereby increasing customer satisfaction.

Generally described, the present invention calculates the optimal number of digital and analog radios in a dual-mode wireless telecommunication system based upon a predicted offered digital load, a predicted offered analog load, and an analog blocking factor. The predicted analog and digital loads are estimates of the actual analog and digital communication traffic that will be encountered when the radios are installed. The predicted analog and digital loads may be estimated by examining a number of factors, including the number of subscribers, current analog and digital loads in the sector or network, and the average digital and analog subscriber talk time. The offered analog and digital loads can be predicted based upon these and other factors apparent to those skilled in the art.

The analog blocking factor represents the percentage of the time calls on an analog communication channel are blocked, or not permitted to complete. For instance, an analog blocking factor of 5% indicates that 5% of all analog calls are being blocked. A high analog blocking factor indicates that a high percentage of calls are being blocked and will result in customer dissatisfaction. A low analog blocking factor indicates that few calls are being blocked and may indicate that there is too much analog capacity for the load being served. Typically, an analog blocking factor of about 5% is chosen so as to balance these considerations.

Once the offered loads have been predicted and the analog blocking factor has been determined, the present invention calculates the needed number of analog radio channels necessary to support the offered analog load at the analog blocking factor. Because the capacity of the needed number of analog radio channels is typically greater than the offered analog load, some excess capacity is usually available on the analog channels. The present invention subtracts the offered analog load from the capacity of the needed analog radio channels to determine the excess capacity of the needed channels.

Once the excess capacity of the needed analog channels has been determined, the present invention calculates a digital blocking factor based upon the excess analog capacity. The present invention may also advantageously compare the digital blocking factor to minimum and maximum overflow values to ensure that the digital blocking factor is neither too high nor too low. This advantageously ensures that neither too many nor too few calls are blocked.

Once the predicted offered digital load and the computed digital blocking factor have been determined, the present invention calculates the number of needed digital radio channels necessary to support the predicted offered digital load at the calculated digital blocking factor. The number of digital and analog radios necessary to provide the needed number of analog and digital channels, respectively, may then be calculated.

That the present invention and the exemplary embodiments thereof overcome the problems and drawbacks set forth above and accomplish the objects of the invention set forth herein will become apparent from the detailed description of exemplary embodiments and appended drawings and claims that follow.

DETAILED DESCRIPTION OF EXEMPLARY EMBODIMENTS

Figure 1:
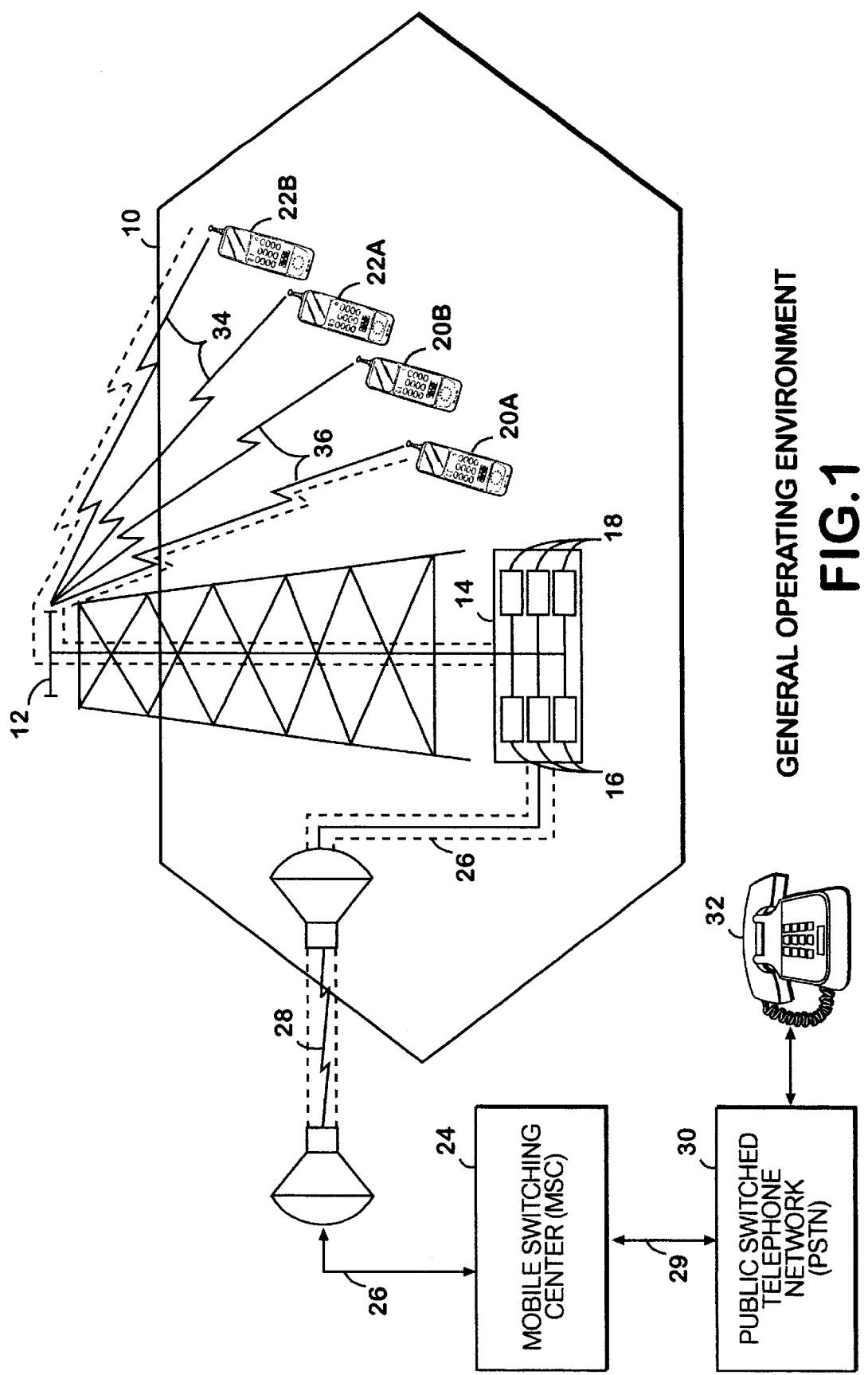
FIG. 1 is a block diagram illustrating an exemplary operating environment for illustrative embodiments of the present invention.

The present invention is directed toward a method and apparatus for calculating the optimal number of analog and digital radios for use in a dual-mode wireless telecommunication system. In an illustrative embodiment, the present invention is embodied in an application program running on a conventional personal computer for calculating the optimal number of analog and digital radios in a dual-mode network.

In the illustrative embodiment of the present invention, an offered digital load and an offered analog load are received. The offered analog load and the offered digital load are predicted values describing the amount of analog and digital network traffic that the analog and digital radios, respectively, are likely to receive when installed in an actual wireless network. The offered digital load and offered analog load may be predicted from accounting data regarding the number of wireless subscribers in a given service area, the wireless features available in the area, the average call length of subscribers in the area, and similar factors. Those skilled in the art will be familiar with the factors used to predict the offered digital and analog loads for a given service area or entire network.

The analog and digital offered loads are described in units of Erlangs. Erlangs are a dimensionless unit that describe how often a circuit is busy. An Erlang is equal to the number of calls per second multiplied by the number of seconds per call. Therefore, one Erlang is equal to one circuit that is busy 100% of the time.

In the illustrative embodiment of the present invention, an analog blocking factor is also received. The analog blocking factor describes the percentage of time analog calls are blocked from completing and a fast busy signal is played indicating that the network is unable to handle the call. A high analog blocking factor indicates that a high percentage of calls will be blocked. A low analog blocking factor indicates that a low percentage of calls will be blocked, and may further indicate that there is excess analog capacity for the actual analog load. Typically, an analog blocking factor of about 5% is chosen to balance these considerations. These and other factors used to determine the appropriate analog blocking factor will be apparent to those skilled in the art.

Once the offered digital load, the offered analog load, and the analog blocking factor have been received, the present invention calculates the number of needed analog communication channels necessary to support the offered analog load at the analog blocking factor. The present invention may use an "Erlang B" formula to perform this calculation. An Erlang B formula is a mathematical formula well known to those skilled in the art for calculating the number of communication channels required to support an offered load in Erlangs at a given blocking factor. The present invention may also consult an Erlang B table that maps loads and blocking factors to the number of needed channels to determine the number of needed communication channels. Erlang B tables can be found in cellular handbooks and are well known to those skilled in the art. The present invention may utilize a computer database containing an Erlang B table to determine the required number of channels.

Once the present invention has calculated the number of needed analog channels to support the offered analog load at the analog blocking factor, the present invention calculates the excess capacity of the needed analog channels. Because the predicted capacity of the needed analog channels is typically greater than the offered analog load, some analog capacity will be available to handle overflow from digital channels. To calculate the excess capacity of the needed analog channels, the present invention subtracts the offered analog load from the predicted capacity of the needed analog radio channels. For instance, if 11 analog radio channels providing 7.08 Erlangs are needed to handle an offered analog load of 6.9 Erlangs, there will be 0.18 Erlangs (7.08–6.9) of excess analog capacity available for overflow from digital channels.

Once the excess capacity of the needed analog radio channels has been calculated, the present invention calculates a digital blocking factor. To ensure that an ideal volume of digital traffic will overflow onto the analog radios, the present invention uses the excess analog capacity to determine the digital blocking factor. In particular, the present invention divides the excess capacity of the needed analog radio channels by the offered digital load to determine the digital blocking factor. For instance, if, as described above, 0.18 Erlangs of analog capacity are available for overflow from digital channels and the offered digital load is 5 Erlangs, the digital blocking factor is 3.6% (0.18/5).

Once the digital blocking factor has been calculated, the present invention calculates the number of digital radio channels necessary to support the offered digital load at the digital blocking factor. As described above with reference to calculating the number of analog radio channels, the present invention may utilize an Erlang B formula or a table of Erlang B values to determine the number of digital radio channels necessary to support the offered digital load at the digital blocking factor.

Once the number of analog radio channels and digital radio channels necessary to support the offered loads at the blocking factors have been determined, the present invention may calculate the number of radios necessary to support the loads. Typically, each analog and digital radio can provide three communication channels. Therefore, the present invention divides the number of analog radio channels necessary to support the offered analog load at the analog blocking factor by the number of analog radio channels supplied by each radio to determine the number of radios necessary. Likewise, the present invention divides the number of digital radio channels necessary to support the offered digital load at the digital blocking factor by the number of digital radio channels supplied by each radio to determine the number of radios necessary. In this manner, the present invention calculates the optimal number of analog and digital radios for use in a dual-mode wireless telecommunication network. Those skilled in the art will appreciate that the above-described method may be used to calculate the number of radios for a single cell, multiple cells, or an entire network.

According to a second illustrative embodiment of the present invention, an offered analog load, an offered digital load, and an analog blocking factor are received. Minimum overflow and maximum overflow values are also received. The minimum overflow value represents the minimum percentage overflow from digital to analog. The maximum overflow value represents the maximum percentage overflow from digital to analog. As will be described below, these values are used to ensure that the digital blocking factor always remains within certain tolerances.

Once the values have been received, the present invention calculates the number of analog radio channels necessary to support the offered analog load at the analog blocking factor. As described above, the present invention may utilize an Erlang B formula or an Erlang B table to perform this calculation. The present invention then determines the excess capacity of the needed analog channels and converts the excess capacity to a digital blocking factor in the manner described above.

Once the digital blocking factor has been calculated, the present invention compares the digital blocking factor to the minimum and maximum overflow. If the digital blocking factor is greater than the maximum overflow, the digital blocking factor is set equal to the maximum overflow. If the digital blocking factor is less than or equal to the maximum overflow, the present invention compares the digital blocking factor to the minimum overflow. If the digital blocking factor is less than the minimum overflow, the digital blocking factor is set equal to the minimum overflow. In this manner, the digital blocking factor will advantageously not be less than the minimum overflow and will not be greater than the maximum overflow.

Once the digital blocking factor has been compared to the minimum and maximum overflow values and adjusted if necessary, the present invention determines the number of digital channels necessary to support the offered digital load at the digital blocking factor. The necessary number of digital channels may be calculated using an Erlang B formula or table as described above. The present invention then calculates the number of analog and digital radios necessary to provide the needed number of analog and digital radio channels.

Figure 2:
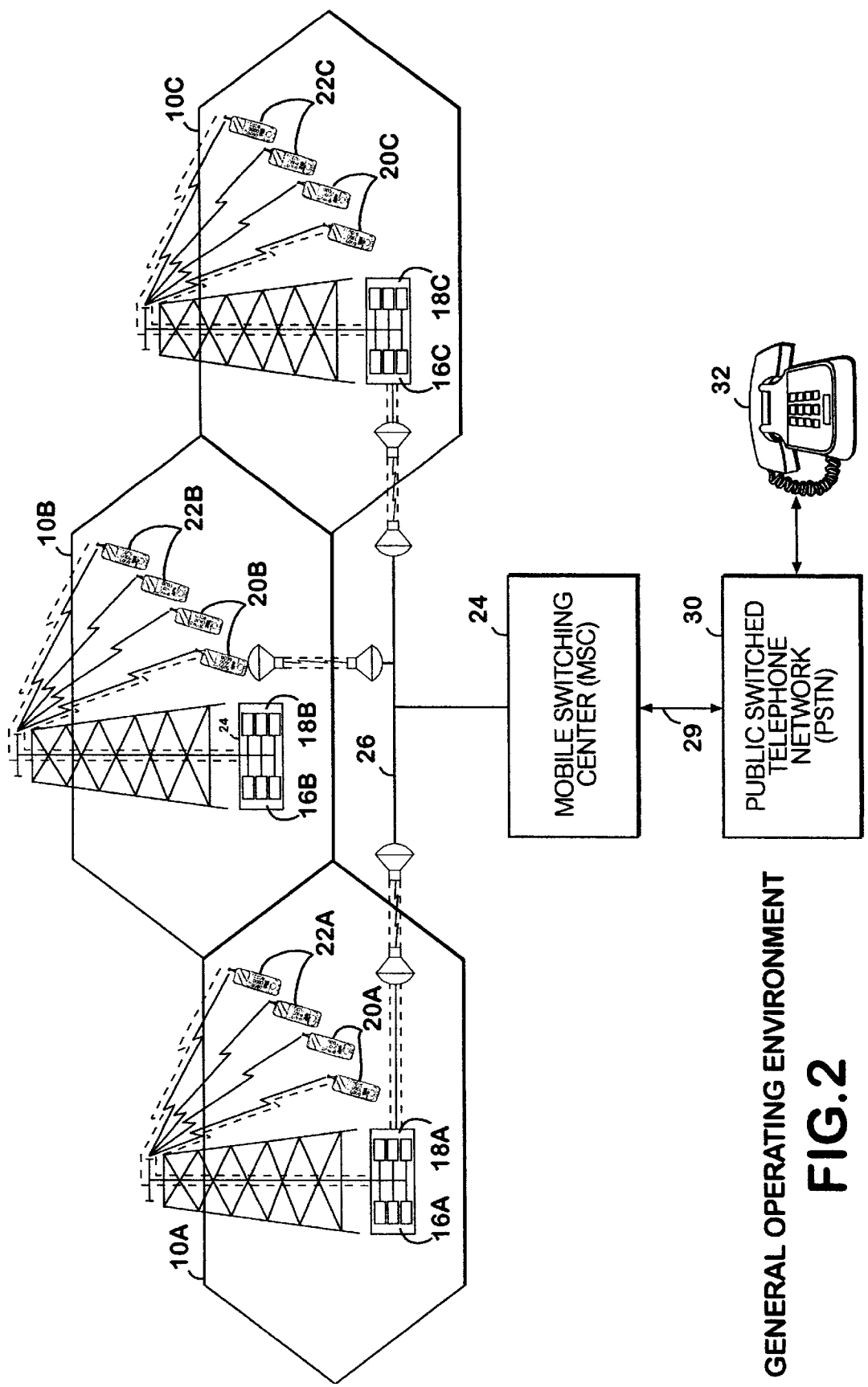
FIG. 2 is a second illustration of an exemplary operating environment for illustrative embodiments of the present invention.
Figure 3:
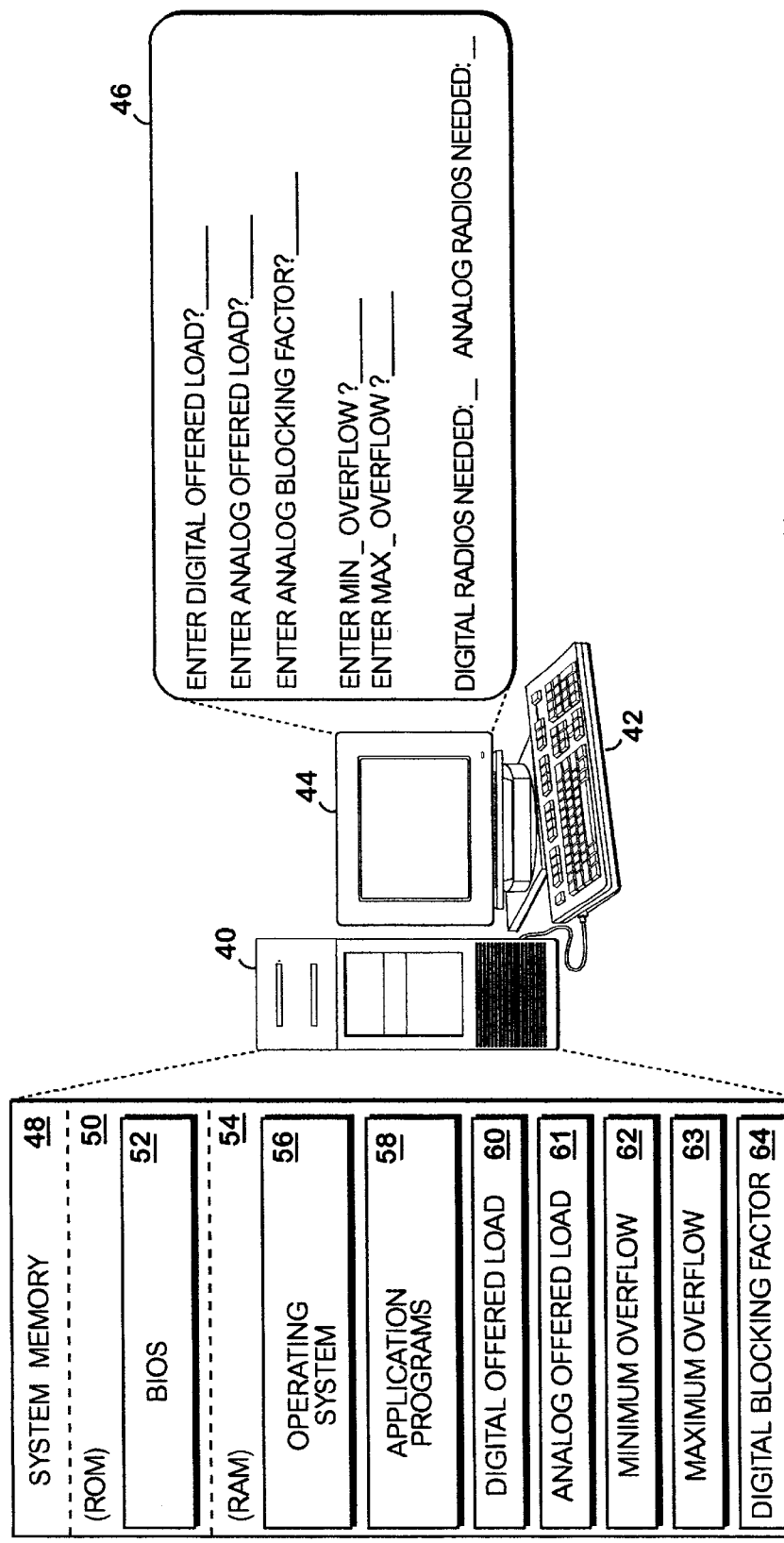
FIG. 3 is a diagram showing an illustrative embodiment of the present invention.
Figure 4:
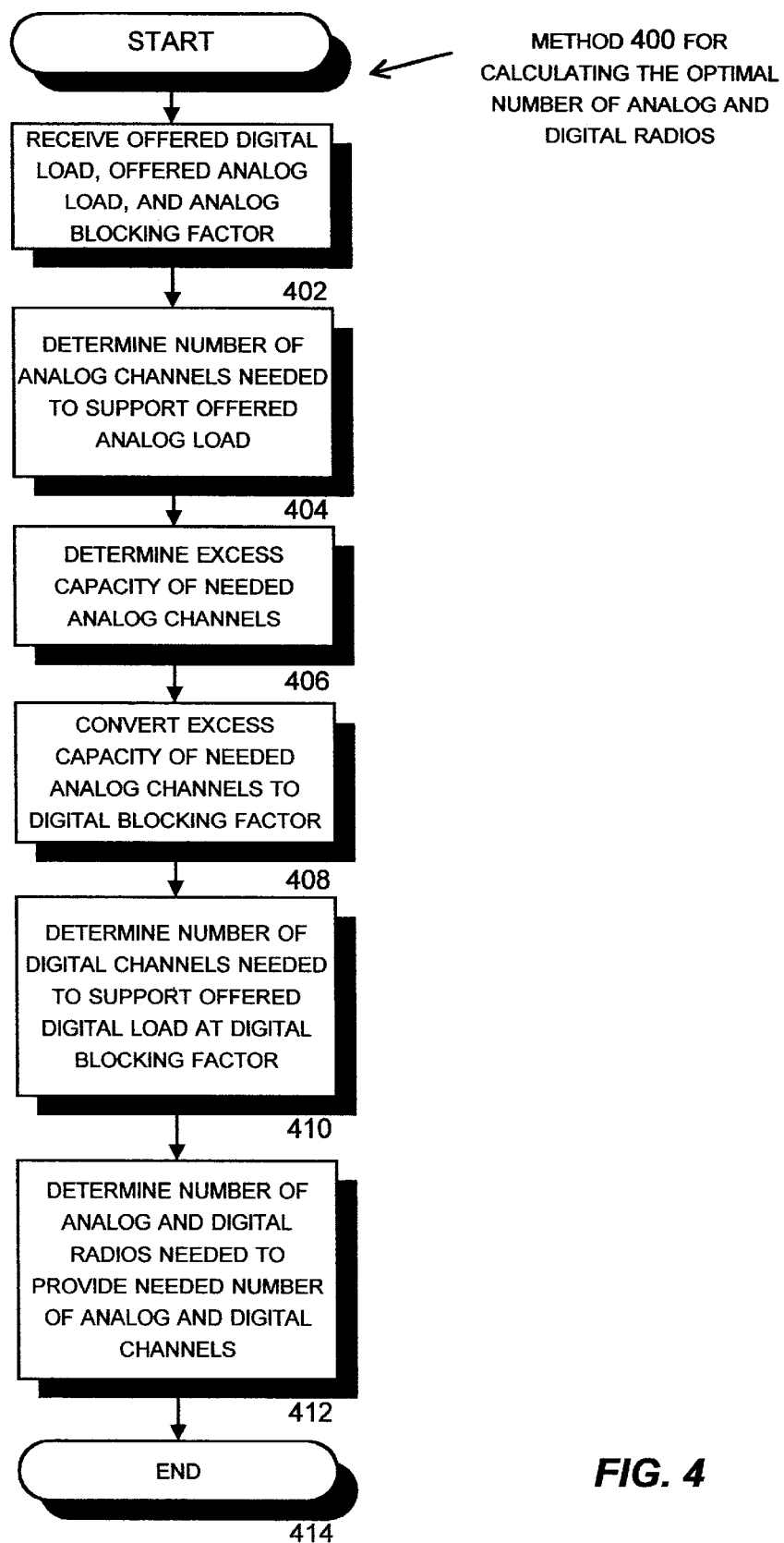
FIG. 4 is a flow diagram showing an illustrative method for calculating the optimal number of analog and digital radios in a dual-mode wireless telecommunication system.
Figure 5:
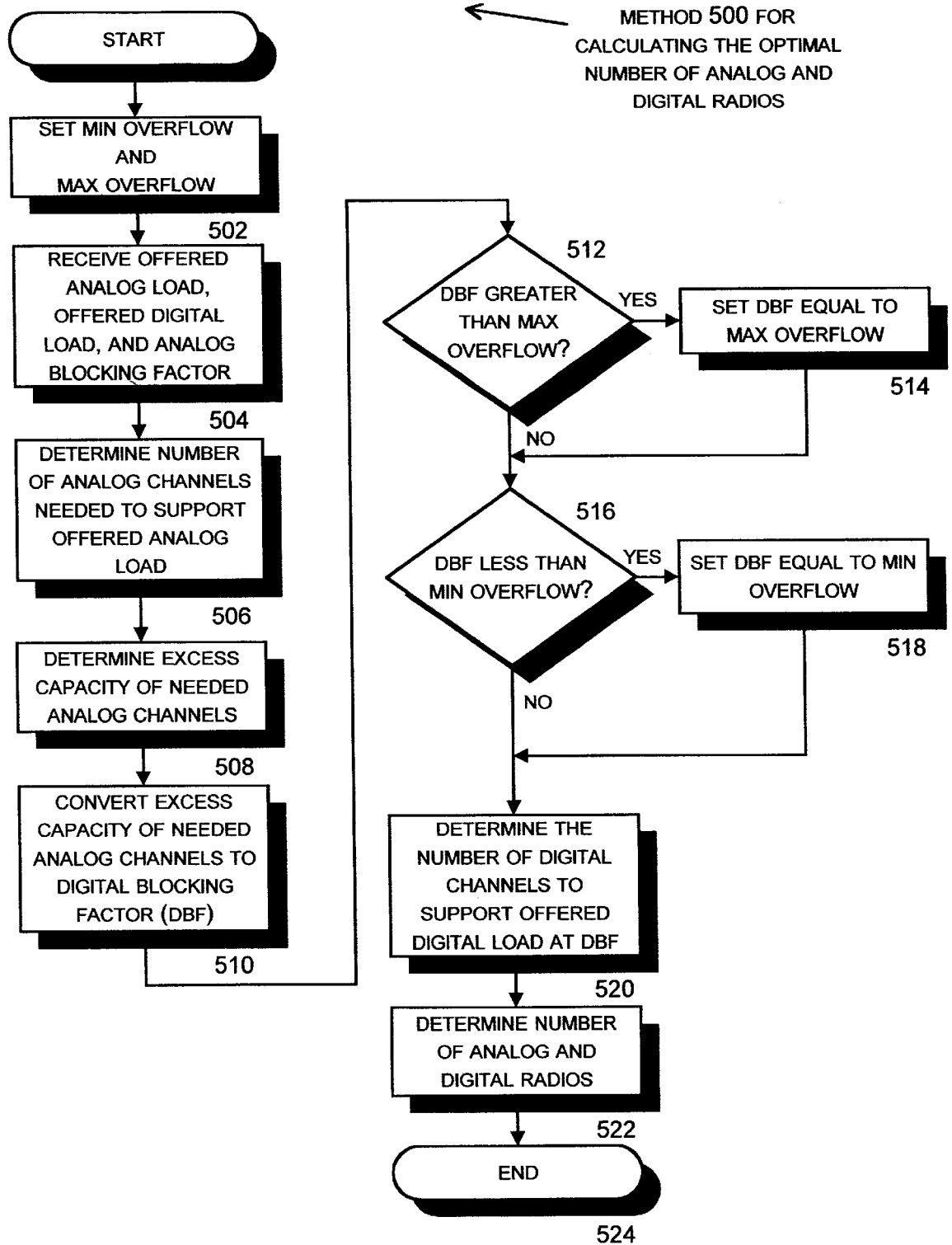
FIG. 5 is a flow diagram showing a second illustrative method for calculating the optimal number of analog and digital radios in a dual-mode wireless telecommunication system.

Referring now to the drawings, in which like numerals represent like elements throughout the several figures, exemplary embodiments of the present invention will be described with reference to the appended drawings. FIG. 1 is a block diagram illustrating an exemplary operating environment for illustrative embodiments of the present invention. FIG. 2 is a block diagram illustrating a second exemplary operating environment for illustrative embodiments of the present invention. FIG. 3 is a diagram showing an illustrative embodiment of the present invention. The remaining figures, FIGS. 4 and 5, are logic flow diagrams that illustrate methods for implementing the illustrative embodiments of the present invention.

Exemplary Operating Environment

FIGS. 1 and 2 illustrate exemplary operating environments for embodiments of the present invention. Referring now to FIG. 1, a typical cellular mobile radiotelephone (CMR) system is illustrated that includes a geographic radio service area, such as cell 10. A plurality of such cells are typically provided in a wireless provider's system. The cell 10 is served by a broadcast antenna 12 to permit communications between cellular mobile radiotelephones operating within the cell 10 and cell control 14. In a dual-mode wireless system, a plurality of analog mobile radio telephones 20*a*–20*b* may communicate with the cell control 14 via analog cellular communications link 26 and via broadcast antenna 12. Likewise, a plurality of digital mobile radio telephones 22*a*–22*b* may communicate with the cell control 14 via digital cellular communications link 34 and via broadcast antenna 12. Although the present invention is described in the context of a dual-mode cellular wireless telecommunication network, those skilled in the art will appreciate that the present invention may be utilized in connection with any type of dual-mode wireless network that utilizes analog and digital radios and permits rollover from digital to analog. Other uses of the present invention will also be apparent to those skilled in the art.

The cell control 14 includes a plurality of analog radios 16 and digital radios 18. Each analog radio 16 provides a plurality of analog communication channels for receiving and sending wireless communications to analog mobile radio telephones 20*a*–20*b*. Likewise, each digital radio 18 provides a plurality of digital communication channels for receiving and sending wireless communications to digital mobile radio telephones 22*a*–22*b*.

A mobile telephone switching office, such as the mobile switching center (MSC) 24, can communicate with the cell 10 either by dedicated telephone facilities (not shown) or, more frequently, by a cell-to-mobile switching center data link 26 between the cell control 14 and the MSC 24. At least a portion of the data link 26 is supported by a wireless communications link, such as the microwave link 28, located between the cell 10 and the MSC 24.

The MSC 24 normally couples telephone conversations involving mobile radiotelephones operating in the cell 10, such as analog mobile radio telephones 20*a*–20*b* and digital mobile radio telephones 22*a*–22*b*, to the public switched telephone network (PSTN) 30 through telephone facilities 29. In this manner, telephone conversations may be connected between terminating equipment 32 and analog mobile radio telephones 20*a*–20*b* or digital mobile radio telephones 22*a*–22*b*.

Referring now to FIG. 2, a second illustration of a general operating environment for embodiments of the present invention will be described. As discussed above, a typical cellular mobile radiotelephone system includes a plurality of cells, such as cells 10a–10c. Each of cells 10a–10c is served by a broadcast antenna to permit communications between cellular mobile radiotelephones operating within the cell 10a–10c and each cell's cell control.

In each cell 10a–10c, a plurality of analog mobile radio telephones 20a–20c and a plurality of digital mobile radio telephones 22a–22c may communicate via analog cellular communications links and via broadcast antennae located in each cell. In order to facilitate this communication, each cell 10a–10c is equipped with a plurality of analog radios 16a–16c and digital radios 18a–18c. Each analog radio 16a–16c provides a plurality of analog communication channels for receiving and sending wireless communications to analog mobile radio telephones 20a–20c located within each radio's respective cell. Likewise, each digital radio 18a–18c provides a plurality of digital communication channels for receiving and sending wireless communications to digital mobile radio telephones 22a–22c located within each radio's respective cell 10a–10c.

A mobile telephone switching office, such as MSC 24, shown in FIG. 2, may communicate with a plurality of cells, such as cells 10a–10c, either by dedicated telephone facilities (not shown) or by a cell-to-mobile switching center data link 26 between each cell's cell control and the MSC 24. The data link 26 may be supported by a microwave link located between the cells 10a–10c and the MSC 24. The MSC 24 then couples telephone conversations involving mobile radiotelephones operating in the cells 10a–10c to the public switched telephone network (PSTN) 30 through telephone facilities 29. Calls may therefore be connected between terminating equipment 32 and digital mobile radio telephones 22a–22c or analog mobile radio telephones 20a–20c operating in either of cells 10a–10c. With this preface on the general operating environments of the present invention in mind, illustrative embodiments of the present invention will now be described.

Illustrative Embodiment of the Present Invention

Referring now to FIG. 3, an illustrative embodiment for implementing the invention includes a conventional personal computer 40, including a processing unit (not shown), a system memory 48, and a system bus (not shown) that couples the system memory to the processing unit. The system memory 48 includes read only memory 50 (ROM) and random access memory 54 (RAM). A basic input/output system 52 (BIOS), containing the basic routines that help to transfer information between elements within the personal computer 40, such as during startup, is stored in ROM 50.

A user may enter commands and information into the personal computer 40 through a keyboard 42 or other type of input device. A monitor 44 or other type of display device is also connected to the personal computer for displaying output. In addition to the monitor, personal computers typically include other peripheral output devices (not shown), such as speakers or printers. The personal computer 40 may further include a hard disk drive, a magnetic disk drive, e.g., to read from or write to a removable disk, and an optical disk drive, e.g., for reading a CD-ROM disk or to read from or write to other optical media.

An illustrative display screen 46 as used in connection with an exemplary embodiment may be displayed on monitor 44 and may prompt a user to input information through keyboard 42. For instance, the user may be prompted to enter a digital offered load, an analog offered load, an analog blocking factor, a minimum overflow, and a maximum overflow through keyboard 42. The exemplary embodiment may then compute the number of digital and analog radios necessary to support the offered loads and display the results on the monitor 44, as shown in screen display 46. The variables used in connection with the exemplary embodiment may also be stored in RAM 54, such as digital offered load 60, analog offered load 61, minimum overflow 62, maximum overflow 63, and digital blocking factor 64. A number of program modules may be also stored in the drives and RAM 54, including an operating system 56, one or more application programs 58, other program modules, and program data.

It will be apparent to those skilled in the art that the personal computer 40 may operate stand-alone, or in a networked environment using logical connections to one or more remote computers. The remote computer may be a server, a router, a peer device or other common network node, and typically includes many or all of the elements described relative to the personal computer 40. Such networking environments are commonplace in offices, enterprise-wide computer networks, intranets and the Internet.

As discussed earlier, the illustrative embodiments of the present invention are embodied in an application program 58. The operating system 56 generally controls the operation of the previously discussed personal computer 40, including input/output operations. It will be apparent to those skilled in the art that the invention can be implemented for use with any computer operating system. Moreover, although the illustrative embodiment will be generally described in the context of an application program running on a personal computer, those skilled in the art will recognize that the present invention may be implemented in conjunction with application programs or with other program modules for other types of computers. Likewise, the invention may be implemented in connection with a stand-alone hardware device or through other means apparent to those skilled in the art.

Calculating the Optimal Number of Analog and Digital Radios in a Dual-mode Wireless Telecommunication Network FIGS. 4 and 5 illustrate several exemplary methods for calculating the optimal number of analog and digital radios in a dual-mode wireless telecommunication network. Referring now to FIG. 4, the method 400 for calculating the optimal number of analog and digital radios will be described. The method 400 begins at step 402, where an offered digital load, an offered analog load, and an analog blocking factor are received. The method 400 continues from step 402 to step 404, where the number of needed analog radio channels necessary to support the offered analog load at the analog blocking factor is determined. An Erlang B formula or an Erlang B table may be consulted to perform this calculation.

From step 404, the method 400 continues to step 406 where the excess capacity of the needed analog radio channels is determined. The offered analog load may be subtracted from the predicted capacity of the needed analog radio channels to determine the excess capacity. The method 400 then continues from step 406 to step 408, where the excess capacity is converted to a digital blocking factor. The excess capacity may be divided by the offered digital load to compute the digital blocking factor.

From step 408, the method 400 continues to step 410, where the number of needed digital radio channels necessary to support the offered digital load at the digital blocking factor is determined. An exemplary embodiment of the present invention may utilize an Erlang B formula or consult a database of Erlang B values to perform this calculation. Other calculation methods known to those skilled in the art may also be used.

From step 410, the method 400 continues to step 412, where the number of analog and digital radios necessary to provide the needed number of analog and digital channels is calculated. The needed number of analog radio channels may be divided by the number of channels provided by each analog radio to determine the number of analog radios. Likewise, the needed number of digital radio channels may be divided by the number of channels provided by each digital radio to determine the number of digital radios. The method 400 ends at step 414.

Referring now to FIG. 5, a second illustrative method for calculating the optimal number of analog and digital radios in a dual-mode wireless network will be described. The method 500 begins at step 502 where a minimum overflow and maximum overflow value are received. The method 500 continues from step 502 to 504, where an offered digital load, an offered analog load, and an analog blocking factor are also received. The method 500 continues from step 504 to step 506, where the number of needed analog radio channels necessary to support the offered analog load at the analog blocking factor is determined. An Erlang B formula may be used or an Erlang B table may be consulted to determine the correct number of channels.

From step 506, the method 500 continues to step 508 where the excess capacity of the needed analog radio channels is determined. The offered analog load may be subtracted from the predicted capacity of the needed analog radio channels to determine the excess capacity. The method 500 then continues from step 508 to step 510, where the excess capacity is converted to a digital blocking factor. The excess capacity may be divided by the offered digital load to compute the digital blocking factor.

From step 510, the method 500 continues to step 512, where the digital blocking factor is compared to the maximum overflow to determine if the digital blocking factor is greater than the maximum overflow. If the digital blocking factor is greater than the maximum overflow, the method branches to step 514, where the digital blocking factor is set equal to the maximum overflow. The method then continues from step 514 to step 516. If the digital blocking factor is less than or equal to the maximum overflow, the method 500 continues from step 512 to step 516.

At step 516, the digital blocking factor is compared to the minimum overflow to determine if the digital blocking factor is less than the minimum overflow. If the digital blocking factor is less than the minimum overflow, the method branches to step 518, where the digital blocking factor is set equal to the minimum overflow. The method 500 then continues from step 518 to step 520. If the digital blocking factor is greater than or equal to the minimum overflow, the method continues directly from step 516 to step 520.

At step 520, the number of needed digital radio channels necessary to support the offered digital load at the digital blocking factor is determined. An exemplary embodiment of the present invention may utilize either an Erlang B formula or an Erlang B table to perform this calculation. Other methods known to those skilled in the art may also be used.

From step 520, the method 500 continues to step 522, where the number of analog and digital radios necessary to provide the needed number of analog and digital channels is calculated. The needed number of analog radio channels may be divided by the number of channels provided by each analog radio to determine the number of analog radios. Likewise, the needed number of digital radio channels may be divided by the number of channels provided by each digital radio to determine the number of digital radios. The method 500 ends at step 524.

In view of the foregoing, it will be appreciated that the present invention provides a method and apparatus for calculating the optimal number of analog and digital radios in a dual-mode wireless telecommunication network. It should be understood that the foregoing relates only to specific embodiments of the present invention, and that numerous changes may be made therein without departing from the spirit and scope of the invention as defined by the following claims.

What is claimed is:

1. A method for calculating a number of digital and analog radio channels in a dual-mode wireless telecommunication network, comprising the steps of:
   (a) determining a number of analog radio channels needed to support an offered analog load at an analog blocking factor;
   (b) determining an excess capacity of the needed analog radio channels;
   (c) determining a digital blocking factor based upon the excess capacity of the needed analog radio channels; and
   (d) based upon an offered digital load and the digital blocking factor, determining the number of digital radio channels needed to support the offered digital load at the digital blocking factor.

2. The method of claim 1, wherein step (b) comprises subtracting the offered analog load from a predicted capacity of the needed analog radio channels to determine the excess capacity of the needed analog radio channels.

3. The method of claim 2, wherein step (c) comprises dividing the excess capacity of the needed analog radio channels by the offered digital load to determine the digital blocking factor.

4. The method of claim 1, further comprising:
   (e) calculating the number of digital and analog radios necessary to provide the needed analog and digital radio channels.

5. The method of claim 1, wherein step (a) comprises consulting a table showing the number of channels needed to support different offered loads at different blocking factors to determine the minimum number of analog radio channels needed to support the offered analog load at the analog blocking factor.

6. The method of claim 1, wherein step (d) comprises consulting a table showing the number of channels needed to support different offered loads at different blocking factors to determine the minimum number of digital radio channels needed to support the offered digital load at the digital blocking factor.

7. A method for calculating a number of digital and analog radio channels in a dual-mode wireless telecommunication network, comprising the steps of:
   (a) receiving an offered digital load, an offered analog load, and an analog blocking factor;
   (b) determining a number of analog radio channels needed to support the offered analog load at the analog blocking factor;
   (c) subtracting the offered analog load from a predicted capacity of the needed analog radio channels to determine an excess capacity of the needed analog radio channels;
   (d) determining a digital blocking factor based upon the excess capacity of the needed analog radio channels;
   (e) comparing the digital blocking factor to a predetermined minimum overflow to determine if the digital blocking factor is less than the minimum overflow;

(f) in response to determining that the digital blocking factor is less than the minimum overflow, setting the digital blocking factor equal to the minimum overflow; and (g) based upon the offered digital load and the digital blocking factor, determining the number of digital radio channels needed to support the offered digital load at the digital blocking factor.

8. The method of claim 7, wherein step (f) comprises in response to determining that the digital blocking factor is less than the minimum overflow, comparing the digital blocking factor to a predetermined maximum overflow and setting the digital blocking factor equal to the maximum overflow if the digital blocking factor is less than the maximum overflow.

9. The method of claim 7, wherein step (d) comprises dividing the excess capacity of the needed analog radio channels by the offered digital load to determine the digital blocking factor.

10. The method of claim 7, further comprising:
(h) calculating the number of digital and analog radios necessary to provide the needed number of analog and digital radio channels.

11. The method of claim 7, wherein step (b) comprises consulting a table describing the number of channels needed to support different offered loads at different blocking factors to determine the minimum number of analog radio channels needed to support the offered analog load at the analog blocking factor.

12. The method of claim 7, wherein step (g) comprises consulting a table describing the number of channels needed to support different offered loads at different blocking factors to determine the minimum number of digital radio channels needed to support the offered digital load at the digital blocking factor.

13. A computer-readable medium on which is stored a computer program for determining a number of analog and digital radios necessary to support an offered analog load and an offered digital load in a dual-mode wireless telecommunication network, the computer program comprising instructions, which when executed by a computer, perform the steps of:

(a) receiving variables describing an offered analog load, an offered digital load, and an analog blocking factor;

(b) determining a number of analog radio channels needed to provide enough analog radio bandwidth to support the offered analog load at the analog blocking factor;

(c) subtracting the offered analog load from a predicted capacity of the needed analog radio channels to determine the excess capacity of the analog radio channels;

(d) dividing the excess capacity of the analog radio channels by the offered digital load to determine a digital blocking factor; and (e) determining a number of digital radios needed to provide enough digital radio bandwidth to support the offered digital load at the digital blocking factor, and determining a number of analog radios needed to provide the needed analog radio channels.

14. The computer-readable medium of claim 13, wherein step (b) comprises accessing an Ehrlang B database to determine the number of analog radio channels needed to provide enough analog radio bandwidth to support the offered analog load at the analog blocking factor.

15. The computer-readable medium of claim 13, wherein step (e) comprises:
accessing an Ehrlang B database to determine the number of digital radio channels needed to provide enough digital radio bandwidth to support the offered digital load at the digital blocking factor; and
determining a number of digital radios necessary to provide the needed digital radio channels.

16. A computer-readable medium on which is stored a computer program for determining a number of analog and digital radios necessary to support an offered analog load and an offered digital load in a dual-mode wireless telecommunication network, the computer program comprising instructions, which when executed by a computer, perform the steps of:

(a) receiving variables describing an offered analog load, an offered digital load, and an analog blocking factor;

(b) determining a number of analog radio channels needed to provide enough analog radio bandwidth to support the offered analog load at the analog blocking factor;

(c) determining a number of analog radios needed to provide the number of needed analog radio channels;

(d) subtracting the offered analog load from a predicted capacity of the needed analog radios to determine an excess capacity of the analog radios;

(e) dividing the excess capacity of the analog radios by the offered digital load to determine a digital blocking factor; and (f) determining a number of digital radios needed to provide enough digital radio bandwidth to support the offered digital load at the calculated digital blocking factor.

17. A computer-readable medium on which is stored a computer program for determining a number of analog and digital radios necessary to support an offered analog load and an offered digital load in a dual-mode wireless telecommunication network, the computer program comprising instructions, which when executed by a computer, perform the steps of:

(a) receiving variables describing an offered analog load, an offered digital load, and an analog blocking factor;

(b) determining a number of analog radio channels needed to provide enough analog radio bandwidth to support the offered analog load at the analog blocking factor;

(c) determining a number of analog radios needed to provide the number of needed analog radio channels;

(d) subtracting the offered analog load from a predicted capacity of the needed analog radios to determine an excess capacity of the analog radios;

(e) dividing the excess capacity of the analog radios by the offered digital load to determine a digital blocking factor;

(f) determining whether the digital blocking factor is less than a predetermined minimum overflow value or greater than a predetermined maximum overflow value;

(g) in response to determining that the digital blocking factor is less than the predetermined minimum overflow value, setting the digital blocking factor equal to the predetermined minimum overflow value;

(h) in response to determining that the digital blocking factor is greater than the predetermined maximum overflow value, setting the digital blocking factor equal to the predetermined maximum overflow value; and (i) determining a number of digital radios needed to provide enough digital radio bandwidth to support the offered digital load at the digital blocking factor.

* * * * *